(12) United States Patent
Gaa et al.

(10) Patent No.: US 6,491,853 B1
(45) Date of Patent: Dec. 10, 2002

(54) STORAGE-STABLE PLASTICS ADDITIVES

(75) Inventors: Karl Gaa, Burtenbach; Günter Nowy, Aystetten; Gerhard Pfahler, Augsburg; Matthias Zäh, Gersthofen, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 08/744,571

(22) Filed: Nov. 6, 1996

(30) Foreign Application Priority Data

Nov. 6, 1995 (DE) .......................................... 195 41 242

(51) Int. Cl.⁷ .............................................. B02C 31/00
(52) U.S. Cl. ........................ 264/142; 264/140; 264/141; 264/143
(58) Field of Search ................................ 264/140, 141, 264/142, 143

(56) References Cited

U.S. PATENT DOCUMENTS

| 4,418,030 A |   | 11/1983 | Muller et al. |
| 4,434,070 A | * | 2/1984 | Lindner et al. ............. 264/142 |
| 4,578,021 A |   | 3/1986 | Schermutzki |
| 4,769,200 A |   | 9/1988 | Hupfer et al. |
| 5,160,680 A |   | 11/1992 | Serpelloni et al. |
| 5,290,495 A |   | 3/1994 | Numadate et al. |

FOREIGN PATENT DOCUMENTS

| EP | 54868 | 6/1982 |
| EP | 177428 | 4/1986 |
| EP | 210415 | 2/1987 |
| EP | 475201 | 3/1992 |

OTHER PUBLICATIONS

EPO Search Report for application No. 96117265, mail date Feb. 28 1997.
English abstract for JP 02–286657, publication date Nov. 26, 1990.

* cited by examiner

Primary Examiner—Veronica P. Hoke
(74) Attorney, Agent, or Firm—Anthony A. Bisulca

(57) ABSTRACT

The present application relates to storage-stable plastics additives which are prepared by cooling a mixture of 99.9 to 10% by weight of molten additive material and 0.1 to 90% by weight of crystalline additive material after a shaping process.

The shaping process is carried out by forcing the mixture out of a tool provided with die openings, and cooling can be carried out on a cooled conveyor belt.

Even after prolonged storage and/or handling, these plastics additives remain free-flowing and do not stick.

13 Claims, No Drawings

STORAGE-STABLE PLASTICS ADDITIVES

BACKGROUND OF THE INVENTION

Plastics additives are additions to polymers which have a modifying and/or stabilizing action on the polymers. In addition to a chemical part structure in the molecule which is decisive for their function, as a general rule they have substituents with which the "compatibility" (for example solubility, diffusion properties, resistance to extraction and the like) of the additive with the polymeric matrix is regulated (literature: Gächter/Müller, Kunststoffadditive [Plastics Additives], 3rd edition 1990, Carl Hanser Verlag Munich, Vienna, page 33 et. seq.). The functional part of the molecule is also often regulated in its reactivity by very bulky chemical substituents ("sterically hindered phenols" as antioxidants, "sterically hindered amines" as light stabilizers).

These structural elements have the effect that crystallization of such additives during preparation often proceeds only with a delay and/or is incomplete and/or leads to several crystal modifications which can easily be converted into one another. This leads to wide melting ranges (instead of sharp crystallite melting points) or multiple melting points which merge into one another.

Immediately after preparation of a pulverulent handling form, this delayed crystallization and/or rearrangement of the less stable into more stable crystallite structures means that during storage and handling of the products in the course of time, crystallizates grow into the surfaces of particles in contact with them, which leads to mechanical adhesion, felting or caking of the material. The lumps formed in this way interfere considerably in the flow properties and the meterability of the additives, which makes the additive unsuitable for its use. The interference is particularly pronounced if the melting range is below 150° C.

Numerous attempts have been made to improve this property, for example the addition of highly disperse silicic acids or of metal stearates or oxides have been recommended, to powder the surface of the particles which tend to stick (literature: for example Degussa brochures from the pigments publication series: "Aerosil zur Verbesserung des Fliessverhaltens pulverförmiger Substanzen" [Aerosil for improving the flow properties of pulverulent substances], no. 31, 2nd edition 5/1978 and "Synthetische Kieselsäure als Fließhilfsmittel und als Trägersubstanz", [Synthetic silicic acid as a flow auxiliary and as a carrier substance], No. 31, 5th Edition, 5/1992]. One disadvantage of this method is the introduction of undesirable foreign substances into the actual additive.

The preparation of tablet-like, formulations of powder applying a high pressure has also been promoted. The additional working step, which makes the product more expensive and involves a risk of contamination due to mechanical abrasion, must be regarded as a serious disadvantage here. Solidification of the melt and subsequent grinding is also practised. A disadvantage here is that the end product felts and cakes readily under pressure (for example under the weight of a stack of pallets during transportation in summer) and has a high dust content. Spray cooling from the melt has also been proposed, but this involves the disadvantage of very poor control of the crystallization and often very pronounced tendency to caking.

U.S. Pat. No. 4,578,021 describes a machine, with the aid of which granules of uniform size can be prepared, so that subsequent grinding becomes superfluous, from a two-phase mixture comprising a melt and crystal seeds via a drop former with subsequent cooling. The formation of deposits and encrustations in the drop former customary to date is avoided in this process.

The object of the present invention was to provide additives for plastics which, without addition of foreign substances, are still free-flowing and readily meterable even after relatively long storage and handling.

SUMMARY OF THE INVENTION

It has now been found that the tendency of such additives to cake can be eliminated, the meterability and the flow and transportation properties can be improved considerably and the formation of dust or abraded material can be greatly reduced by plastics additives by cooling a mixture of 99.9 to 10% by weight of molten additive material and 0.1 to 90% by weight of crystalline additive material after a shaping process.

By changing the content of crystalline substance, the viscosity of the mixture can be varied within wide limits and adapted to the requirements of the shaping process. The end product is formed here in its stable crystal modification and undergoes no further rearrangement leading to felting of the particles. The end product is formed in a defined, uniform particle size (for example from 0.1 to 10 mm) which can be adjusted in a controlled manner within wide limits by varying the melt viscosity and the shaping process.

The plastics additives according to the invention can advantageously be prepared by employing a mixture of 9.5 to 25% by weight of molten additive material and 0.5 to 75% by weight of crystalline additive material.

DESCRIPTION OF THE PREFERRED EMBODIMENTS

Plastics additives prepared by employing a mixture of 90 to 30% by weight of molten additive material and 10 to 70% by weight of crystalline additive material are also particularly suitable.

Plastics additives which are prepared by employing a mixture of 70 to 50% by weight of molten additive material and 30 to 50% by weight of crystalline additive material are particularly preferred.

The rapid cooling of the mixture can preferably be carried out on a cooled conveyor belt.

Forcing the mixture out of a tool provided with die openings (perforated die) has proved to be a particularly suitable shaping process.

Shaping processes which can be employed are, for example:

- forcing the mixture out of a cylindrical die arrangement by means of a choker bar
- forcing the mixture out of a cylindrical die arrangement with internal toothing and a die bore in the tooth base by an internal toothed wheel
- forcing the mixture out of a cylindrical die arrangement with internal bores and a die bore in the bore base by a stamp
- forcing the mixture through a flat perforated plate by means of edge runners
- forcing the mixture through a flat perforated plate by means of an extruder
- passing through a perforated plate by rotating rolls
- extrusion with an extruder (single- or twin-screw extruder)

pressing out through a mouthpiece of a stapling press provided with several die openings pressing out through a pipe die provided with numerous die openings by means of a stripper doctor blade As a result of the content of crystalline he ten material, easier temperature regulation is achieved, since on cooling, the crystals which increasingly separate out counteract the reduction in temperature by their heat of crystallization, and vice versa.

Plastics additives on which the process according to the invention can be used successfully are, inter alia, additives from the class of UV stabilizers, antioxidants, heat stabilizers, lubricants, antistatics, adhesion promoters, agents which impart compatibility, dispersing auxiliaries, acid scavengers, metal deactivators, peroxide scavengers, processing stabilizers, nucleating agents, optical brighteners, slip agents, antidew agents and flameproofing agents.

Particularly suitable examples are, inter alia, 2-hydroxy4-n-octoxybenzophenone, lauric acid diethanolamide, glycerol mono-, di- and tristearate and mixtures of these glycerol stearates, dioctadecyl sulfide, mixtures of dialkyl mono-, di- and polysulfides, distearyl thiodipropionate, dilauryl thiodipropionate, bisstearoylethylenediamine, pentaerythrityl tetrakis-3-(3,5-di-tert-butyl4-hydroxyphenyl)propionate, octadecyl 3-(3,5-di-tert-butyl-4-hydroxyphenyl)propionate, tetrakis-(2,4-di-tert-butyl-phenyl) 4,4'-biphenylenediphosphonite, distearyl pentaerythritol diphosphite, di(2,2,6,6-tetramethylpiperidin4-yl) sebacate and bis(2,4-di-tert-butylphenyl) pentaerythritol disphosphite.

The following examples are intended to illustrate the invention without limiting it:

EXAMPLE 1

A slurry of a melt of 95% by weight of 2-hydroxy4-n-octoxybenzophenone mixed with 5% by weight of crystalline substance is forced through a perforated die of 1.0 mm diameter, onto a cooled metal belt running past, in the region of its melting point, using a choker bar. Drops are formed which crystallize immediately on lying on the belt and can be stripped off at the end of the belt as solid, dust-free particles with a non-tacky surface.

EXAMPLES 2–7

The experiment from Example 1 is repeated, 1, 10, 30, 50 and 75% by weight of crystallized powder of the same 2-hydroxy4-n-octoxybenzophenone being admixed to the melt. All the particles which have solidified are dust-free and non-tacky.

EXAMPLE 8 (COMPARISON)

The experiment from Example 1 is repeated, no crystallized pulverulent substance being admixed to the product melt.

The drops on the cooled belt have only partly solidified and stick at the end of the belt.

EXAMPLE 9

Various chemicals which are used as a plastics additive are dropped onto a cooled belt and removed at the end in accordance with Example 1, in each case 50% by weight of crystallized substance being admixed. They are tested for their tackiness and tendency to cake as follows:

In each case a glass muff which stands with one open end on a flat substrate and has a diameter of 5.2 cm and a height of 10 cm is filled with in each case 50 g of the formulated substance and pressure is applied from the top with an area pressure of 0.93 N/cm$^2$ by placing a weight on top. The entire arrangement is kept in a heating cabinet at elevated temperature for 24 hours. The pressure of a stack of pallets during transportation under summer temperature conditions is simulated in this manner. For comparison, in each case goods which have been prepared with addition of crystalline contents to the melt during the shaping operation are used for comparison. The expenditure of force with which the bulk product can be crushed back into the individual particles after removal of the enveloping glass muff is evaluated.

| Product | Storage temp. °C. | Expenditure of force for separation | |
|---|---|---|---|
| | | Dropped from a mixture of crystal slurry/melt | Dropped from the pure melt |
| 2-Hydroxy-4-n-octoxy benzophenone | 40 | Disintegrates when touched | High expenditure of force, few solid lumps |
| Lauric acid diethanolamide | 35 | Disintegrates when touched | Very high expenditure of force, few lumps |
| Mixture of glycerol mono-, di- and tristearate | 40 | Disintegrates when touched | High expenditure of force |
| Dioctadecyl disulfide | 40 | Disintegrates immediately | Very high expenditure of force |
| Distearyl thiodipropionate | 40 | Disintegrates immediately | Can be separated with expenditure of force, lumpy |
| Dilauryl thiodipropionate | 35 | Disintegrates under gentle pressure | High expenditure of force, large lumps |
| Bisstearoylethylene diamine | 40 | Disintegrates when touched | Moderate expenditure of force, |
| Pentaerythrityl tetrakis-3-(3,5-di-tert-butyl-4-hydroxyphenyl)-propionate | 40 | Disintegrates immediately | High expenditure of force |
| Octadecyl 3-(3,5-di-tert-butyl-4-hydroxyphenyl)propionate | 40 | Disintegrates when touched | High expenditure of force, lumpy |
| Tetrakis(2,4-di-tert-butyl-phenyl)-4,4'-biphenylenediphosphonite (technical grade isomer mixture) | 35 | Disintegrates when touched | Very high expenditure of force, few lumps |
| Distearyl pentaerythritol diphosphite | 40 | Disintegrates immediately | High expenditure of force, large lumps |
| Bis(2,4-di-tert-butyl-phenyl) pentaerythritol diphosphite | 40 | Disintegrates immediately | Moderate expenditure of force |
| Ethylene glycol bis-3,3-(4-hydroxy-3-tert-butylphenyl) butyrate | 40 | Disintegrates immediately | Moderate expenditure of force |

EXAMPLE 10

A slurry of 2-hydroxy4-n-octoxybenzophenone comprising 90% by weight of melt mixed with 10% by weight of crystalline substance is dropped through a rotating cylindrical die plate with internal toothing and die bores in the tooth base through a toothed wheel onto a cooled metal belt running past below the dies. The drops solidify and are stripped off at the end of the belt. A heat storage experiment according to Example 9 results in bulk material which disintegrates immediately when touched.

EXAMPLE 11

The experiment from Example 10 is repeated, the rotating cylindrical die plate having internal bores with additional die bores in the bore base. The substance is dropped through the dies onto the cooled metal belt running past by a stamp (e.g. triggered mechanically by a cam). The drops solidify and are stripped off at the end of the belt. Storage under heat as in Example 9 again gives a bulk material which disintegrates immediately.

EXAMPLE 12

A slurry of 2-hydroxy4-n-octoxybenzophenone comprising 25% by weight of molten substance and 75% by weight of crystalline substance is forced through a flat perforated plate by means of edge runners. The product is cut off with a stripper blade and falls onto a cooled metal belt. The completely crystallized made-up material is stripped off at the end of the belt. A heat storage experiment according to Example 9 gives a bulk material which disintegrates again immediately.

What is claimed is:

1. A free flowing, readily meterable plastics additive, selected from the group consisting of UV stabilizers, antioxidants, heat stabilizers, lubricants, antistatics, adhesion promoters, agents which impart compatibility, dispersing auxiliaries, acid scavengers, metal deactivators, peroxide scavengers, processing stabilizers, nucleating agents, optical brighteners, slip agents, antidew, agents and flameproofing agents, said additive prepared from an admixture of two portions of materials of said additive, each in a different state, by a method comprising combining as said admixture 99.9 to 10% by weight of molten additive material and 0.1 to 90% by weight of crystalline additive material and cooling said admixture after performing a shaping process.

2. A plastics additive as claimed in claim 1, wherein an admixture of 99.5 to 25% by weight of molten additive material and 0.5 to 75% by weight of crystalline additive material is employed.

3. A plastics additive as claimed in claim 2, wherein an admixture of 90 to 30% by weight of molten additive material and 10 to 70% by weight of crystalline additive material is employed.

4. A plastics additive as claimed in claim 3, wherein an admixture of 70 to 50% by weight of molten additive material and 30 to 50% by weight of crystalline additive material is employed.

5. A plastics additive as claimed in claim 1, wherein the cooling is carried out on a cooled conveyor belt.

6. A plastics additive as claimed in claim 1, wherein the shaping process comprises forcing the mixture out of a die provided with die openings.

7. A plastics additive as claimed in claim 1, wherein the shaping process comprises forcing the mixture out of a cylindrical die arrangement by means of a choker bar.

8. A plastics additive as claimed in claim 1, wherein the shaping process comprises forcing the mixture out of a cylindrical die arrangement with internal toothing and a die bore in the tooth base by an internal toothed wheel.

9. A plastics additive as claimed in claim 1, wherein the shaping process comprises forcing the mixture out of a cylindrical die arrangement with internal bores and a die bore in the bore base by a stamp.

10. A plastics additive as claimed in claim 1, wherein the shaping process comprises forcing the mixture through a flat perforated plate by means of edge runners.

11. A plastics additive as claimed in claim 1, wherein the shaping process comprises forcing the mixture through a flat perforated plate by means of an extruder.

12. A plastics additive as claimed in claim 1, which is an additive from the class of UV stabilizers, antioxidants, heat stabilizers, lubricants, antistatics, adhesion promoters, agents which impart compatibility, dispersing auxiliaries, acid scavengers, metal deactivators, peroxide scavengers, processing stabilizers, nucleating agents, optical brighteners, slip agents, antidew agents and flameproofing agents.

13. A process for the use of a plastics additive as claimed in claim 1 in a polymeric matrix for improving the processing and use properties thereof comprising adding said additive to said polymeric matrix by metering.

* * * * *